(12) United States Patent
Azzopardi et al.

(10) Patent No.: US 12,314,112 B2
(45) Date of Patent: May 27, 2025

(54) POWER OPTIMIZATION FOR A MULTISTAGE STACK OF THERMOELECTRIC COOLING DEVICES

(71) Applicant: UNIVERSITY OF MALTA, Msida (MT)

(72) Inventors: Marc Anthony Azzopardi, San Gwann (MT); Andre Micallef, Birbirkara (MT)

(73) Assignee: UNIVERSITY OF MALTA, Msida (MT)

( * ) Notice: Subject to any disclaimer, the term of this patent is extended or adjusted under 35 U.S.C. 154(b) by 96 days.

(21) Appl. No.: 17/868,839

(22) Filed: Jul. 20, 2022

(65) Prior Publication Data

US 2024/0028100 A1 Jan. 25, 2024

(51) Int. Cl.
*G06F 1/3234* (2019.01)
*G06F 1/20* (2006.01)

(52) U.S. Cl.
CPC .............. *G06F 1/3234* (2013.01); *G06F 1/20* (2013.01)

(58) Field of Classification Search
CPC . G06F 1/20; G06F 1/203; G06F 1/206; G06F 1/26; G06F 1/3234; G06F 1/324; G06F 1/3246
See application file for complete search history.

(56) References Cited

U.S. PATENT DOCUMENTS

| | | | |
|---|---|---|---|
| 4,230,945 A | | 10/1980 | Meir et al. |
| 6,519,157 B1 * | | 2/2003 | Xing ...................... H10N 10/00 165/185 |
| 2004/0211190 A1 | | 10/2004 | Ueki et al. |
| 2005/0078451 A1 * | | 4/2005 | Sauciuc .................. G06F 1/206 361/700 |
| 2012/0312030 A1 | | 12/2012 | Lu |
| 2015/0082811 A1 * | | 3/2015 | Rangarajan ............. G06F 1/324 62/3.7 |
| 2017/0038805 A1 * | | 2/2017 | Chun ..................... G06F 3/0604 |
| 2017/0221862 A1 | | 8/2017 | Chou et al. |
| 2018/0342979 A1 | | 11/2018 | Joardar |
| 2019/0243430 A1 * | | 8/2019 | Slaby ..................... G06F 1/206 |
| 2020/0363104 A1 * | | 11/2020 | MacDonald ............. G06F 1/20 |
| 2022/0312646 A1 * | | 9/2022 | Gao ....................... G06F 1/3203 |

FOREIGN PATENT DOCUMENTS

WO 2011162726 A1 12/2011

OTHER PUBLICATIONS

"PID Controller", in Wikipedia at https://en.wikipedia.org/wiki/PID_controller.
International Search Report for PCT/IB2023/051328 Mailed On May 23, 2023.

* cited by examiner

*Primary Examiner* — Raymond N Phan
(74) *Attorney, Agent, or Firm* — Rivka Friedman

(57) ABSTRACT

Methods and systems and systems provide for temperature control between thermoelectric coolers (TECs or TEMs) in a stack of multiple TECs, by optimizing the power supplied to each TEC in the stack. The temperatures may be continuously monitored, to continuously provide for the aforementioned power optimization.

22 Claims, 4 Drawing Sheets

POWER OPTIMIZATION FOR A MULTISTAGE STACK OF THERMOELECTRIC COOLING DEVICES

CROSS REFERENCES TO RELATED APPLICATIONS

This patent application is related to commonly owned U.S. patent application entitled: Multilevel Thermoelectric Cooling Stack with Thermal Guard Rings (application Ser. No. 17/868,848), filed on the same day as this patent application, the disclosure of this patent application is incorporated by reference in its entirety herein.

TECHNICAL FIELD

The present disclosure is directed to methods for optimizing power consumption to maintain desired temperatures in systems with multiple Thermoelectric Coolers (TECs or TEMs).

BACKGROUND

When controlling multiple TECs in a complex multistage setup, numerous problems arise. First, with multiple control inputs the complexity is great, causing difficulty in modeling the overall TEC stack behavior, such that and thereby making it impossible to accurately determine optimal control parameters for maximal energy efficiency for any given stack temperature differential. Second, users typically operate such systems under different conditions than those intended by the designer. For example, the ambient temperature or thermal load may change, and this results in different temperature differentials and power consumptions, which in turn results in different optimal temperature balances in the system at different times. Finally, several components of the system will differ somewhat from their datasheet specifications, and performance of such components tends to change over time, for example, as components age and deteriorate. This makes design predictions quite inaccurate and almost irrelevant.

SUMMARY

Embodiments of the disclosure are directed to methods and systems, which function to minimize the total amount of electrical power consumed by two or more TECs, for example, arranged, for example, in a TEC stack, to maintain a desired temperature for an element, such as a semiconductor chip, integrated circuit, printed circuit board, electronic or computerized device, and the like. The system is designed to search for the optimal apportionment of temperature across each of the multiple TECs of the system, to achieve a high temperature differential of greater than or equal to −20° C., to minimize the overall power consumed by the entire TEC stack, while meeting a specified cold-side temperature.

The system, for example, is a control system which uses feedback to accurately control each TECs temperature difference, i.e., between the "cold" and "hot" sides of each TEC. The system apportions the power supplied to each TEC in the stack with the objective of minimizing the overall power consumed. For example, the apportioning may be guided by processes including, for example, gradient descent processes, hill climbing processes, and perturb and observe processes. The system accurately and robustly measures temperature readings with the use of calibrated temperature sensors, such as thermocouples, attached to each side of the TECs inside the constructed stack. The system employs a simple and robust communication protocol which allows for communication between a multitude of slave and master devices. This protocol allows for communication between an embedded processor and a number of sensors, for example, temperature sensors, power supplies, analog-to-digital converters, and the like.

Unless otherwise defined herein, all technical and/or scientific terms used herein have the same meaning as commonly understood by one of ordinary skill in the art to which the disclosure pertains. Although methods and materials similar or equivalent to those described herein may be used in the practice or testing of embodiments of the disclosure, exemplary methods and/or materials are described below. To the extent of any conflict, the patent specification, including definitions, will control. In addition, the materials, methods and examples are illustrative only and are not intended to be limiting.

BRIEF DESCRIPTION OF THE DRAWINGS

Some embodiments of the present disclosure are herein described, by way of example only, with reference to the accompanying drawings. With specific reference to the drawings in detail, it is stressed that the particulars shown are by way of example and for purposes of illustrative discussion of embodiments of the disclosure. Dimensions of components and features shown in the figures are chosen for convenience and clarity of presentation and are not necessarily shown to scale. The description taken with the drawings makes apparent to those skilled in the art how embodiments of the disclosure may be practiced.

Attention is now directed to the drawings, where like reference numerals or characters indicate corresponding or like components. In the drawings.

DETAILED DESCRIPTION OF THE DRAWINGS

Figure 1A:
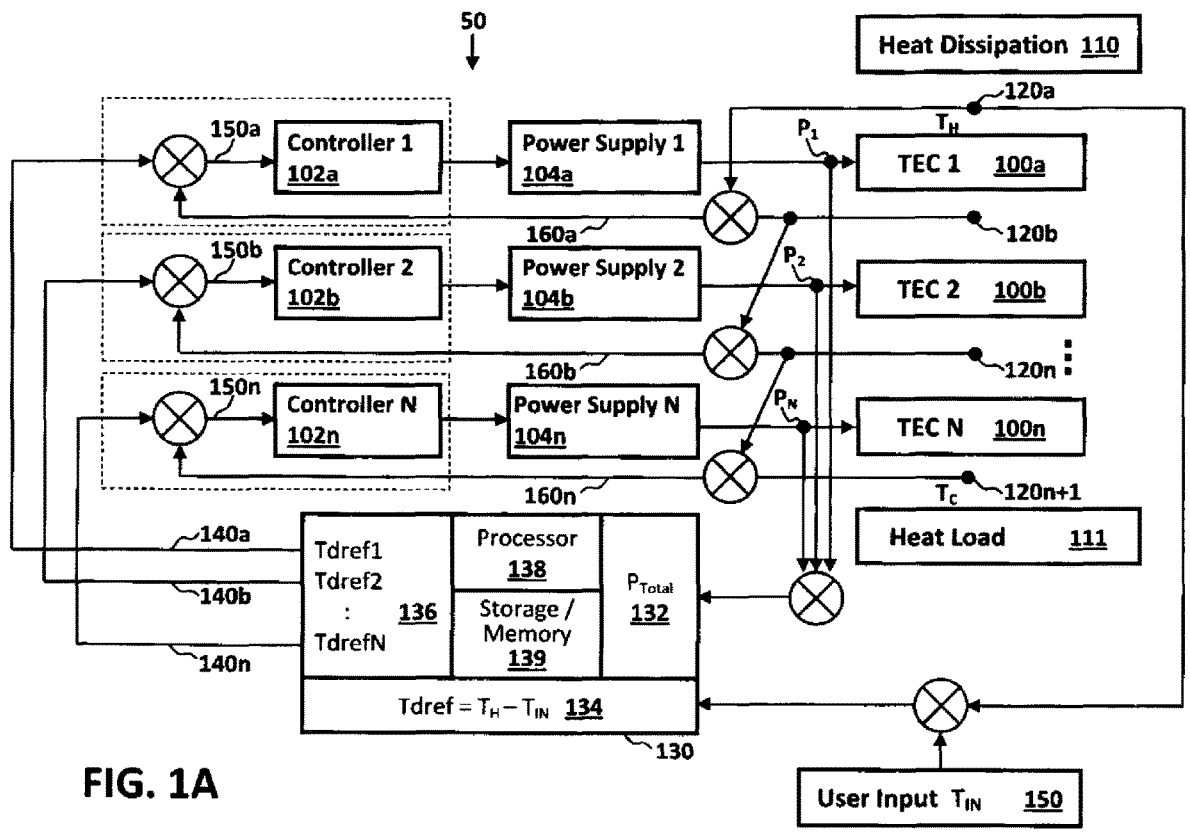
FIG. 1A is a diagram of an exemplary system in which embodiments of the disclosed subject matter are performed.

Before explaining at least one embodiment of the disclosure in detail, it is to be understood that the disclosure is not necessarily limited in its application to the details of construction and the arrangement of the components and/or processes (methods) set forth in the following description and/or illustrated in the drawings. The disclosure is capable of other embodiments or of being practiced or carried out in various ways.

As will be appreciated by one skilled in the art, aspects of the present disclosure may be embodied as a system, process (method) or computer program product. Accordingly, aspects of the present disclosure may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present disclosure may take the form of a computer program product embodied in one or more non-transitory computer readable (storage) medium(s) having computer readable program code embodied thereon.

Throughout this document, numerous textual and graphical references are made to trademarks, and domain names. These trademarks and domain names are the property of their respective owners, and are referenced only for explanation purposes herein.

The present disclosed subject matter provides methods and systems which optimize power consumption of multiple Thermoelectric cooling devices (TECs or TEMs), in relation to each TEC's actual response. For example, the methods and systems and systems provide for temperature control between thermoelectric coolers (TECs or TEMs) in a stack of multiple TECs, by optimizing the power supplied to each TEC in the stack. The temperatures may be continuously monitored, to continuously provide for the aforementioned power optimization.

Methods and systems provide for temperature control between thermoelectric coolers (TECs or TEMs) in a stack of multiple TECs, by optimizing the power supplied to each TEC in the stack. By iteratively adjusting the power supplied to each TEC, the methods and systems disclosed, autonomously determine how to optimally apportion the desired temperature difference across the stack, between individual TECs in the stack, with the aim of minimizing the total power consumed by the entire TEC stack. The temperatures may be continuously monitored, to continuously provide for the aforementioned power optimization.

The system is such that each TEC is provided at a predetermined size, and then controlled by a controller (for example, a Proportional Integral Derivative (PID) controller) and/or feed forward linearization functions. The feed forward linearization functions operate to compensate for any non-linearities of responses from each TEC. As a result, each TEC responds rapidly and in a stable manner, with minimal peak overshoot and steady state error, ensuring that each TEC is not overdriven or under driven once a steady state is reached.

A process for controlling dynamic power optimization by each TEC is triggered once the cold-side temperature of each TEC reaches the steady state. The method is, for example, performed by a processor, which divides the refrigeration load among all of the TECs of the system, for example, in the optimal power efficient manner. The process provides for finding a changeable optimal operating point of the system and tracking it and should a change in external conditions be detected, a new one or more optimum operating points are recalculated.

The process achieves power division, between the TECs of the system, by splitting variables, which divide a user or system requested temperature into individual contributions of each of the TECs of the system, while the global power output of the system is being monitored. The split variables are incremented or decremented iteratively, for example, until the most efficient power point is determined for the system. Various strategies may be adopted to speed up the search for the most efficient power point, and for making the search more thorough.

The process, for example, includes hardware in the loop optimizations to take into account in real-time combined behavior of all components on the system. Such hardware in the loop optimizations include, for example, actual temperature and power values of and/or associated with each TEC of the system, which are measured, for example, by sensors.

The sensors include, for example, analog to digital converters (ADCs), thermocouples and current shunts, to record the dynamics of the system.

Once the system converges to a global minimum output power, the method includes keep on searching iteratively for any changes in the optimal power value. This compensates for external disturbances, which may include, for example, changes in user or system inputs, TEC gain, uncharacterized TEC responses, and/or changes in the hot side temperatures (e.g., different ambient temperatures at the heat sink) of each TEC.

Figure 1B:
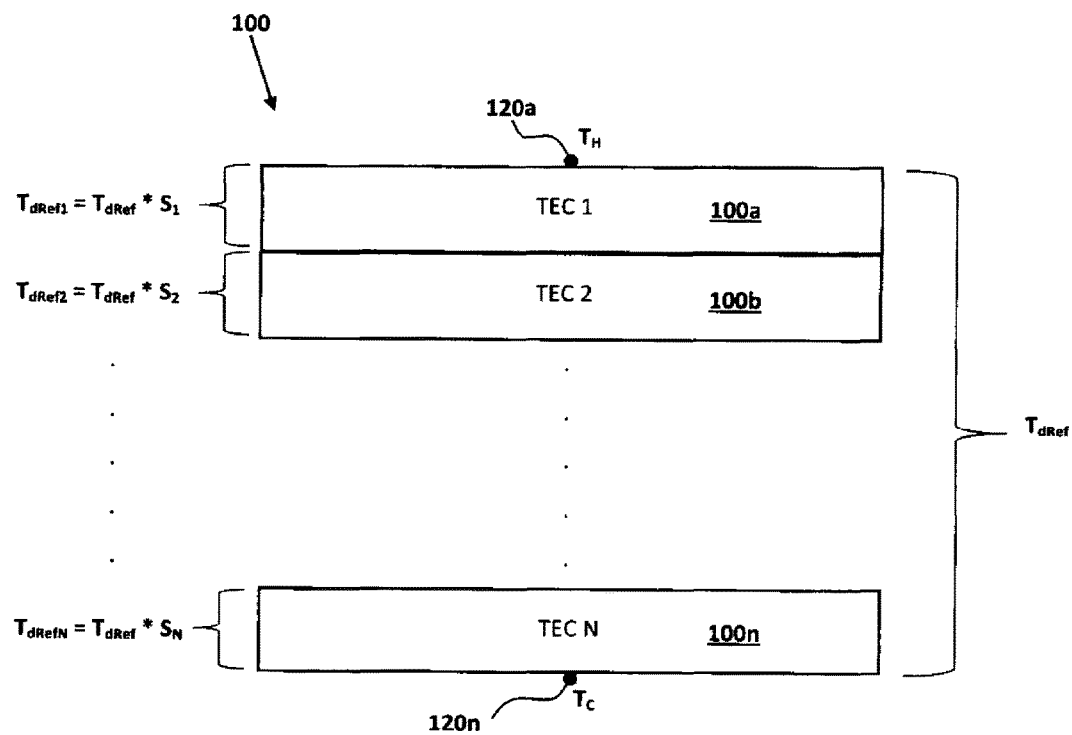
FIG. 1B is a representative mechanical assembly a Thermal Electric stack.

FIG. 1A is a diagram of an example system 50 including a plurality of TEC's, for example, two TECs 100a, 100b, but the description provided for this system is also equally applicable to systems with more than two TECs 100a, 100b, as represented by the TEC 100N, being the last member of the plurality of TECs. In FIGS. 1A and 1B, "N" and "n", after the element numbers are representative of the last member of a series of that element. For example, the system 50 shown is a two or more TEC system, in which power optimization is performed dynamically, with hardware in the loop. Hardware in the loop includes, for example, the use of sensors to measure the actual temperature and power values of and/or associated with each TEC 100a, 100b, 100n of the system 50.

Each TEC 100a, 100b is associated and in communication with a controller 102a, 102b, and a power supply 104a, 104b. Additionally, TEC 100n is associated with controller 102n and power supply 104n, when the system 50 includes more than two TECs.

The TECs 100a, 100b through 100n, are arranged such that a heat dissipation device or heat sink at the "hot" side 110 is prior to the first TEC, for example TEC 100a, and a heat load, also known as a "cold" side 111 follows the last TEC, for example TEC 100n. The TECs 100a, 100b, 100n, are, for example, in a stacked (one on top of the other) arrangement, forming a stack 100, as shown in detail in FIG. 1B. For example, this stacked arrangement is oriented from "top" or "first" to "bottom" or "last", where TEC1 100a is the "top" or "first" TEC, while TECN 100n forms the "bottom" or "last" TEC, of the TEC stack. At the "top" side, sensor 120a provides a measured temperature of $T_H$ of the "hot" side (heat dissipation 110) of the TEC stack, while at the bottom TECN 100n of "cold" side (heat load 111) provides a measured temperature $T_C$, (via temperature sensor 120n+1). The overall temperature differential $T_{dRef}$ (134 FIG. 1A) is the total desired temperature differential between the topmost surface temperature $T_H$ of TEC 100a and the desired bottom surface temperature $T_{IN}$ of the last TEC 100n in the TEC stack.

Temperature sensors 120a, 120b, 120n, 120n+1 ("120n+1" representing the temperature of the coldest point of the TEC stack) are associated with their respective junctions between heat dissipation 110, TECs 100a, 100b, 100n, and heat load 111. For purposes of illustrating the system 50, sensors 120a, 120b, 120n, 120n+1 are described as germane to the system 50.

Sensors 120a and 120b provide temperature readings for example at a given time and are used to compute the difference in temperature across TEC1 100a. This actual temperature difference 160a, and desired temperature differential $T_{dref1}$ 140a are used to compute the error signal 150a. This is then fed into the controller 102a which ensures via 104a that TEC1 100n reaches the desired temperature differential $T_{dRef1}$. Likewise, the same is repeated with the other controllers such as controller 102b, and controller 102n. By the combined action of all the controllers the temperature differential across the entire stack, that is $T_H-T_C$ approaches the desired temperature difference $T_{dRef}$.

Each of the power supplies 104a, 104b, 104n, provides a power reading, detected, for example, by sensors (not shown), or signals corresponding thereto $P_1$, $P_2$, $P_N$, for example, at the given time, to the I/O unit 130. The given time may be, for example, a predetermined time, or a predetermined time interval, or a combination thereof. The given time may also be, for example, in real time.

The input/output (i/o) unit 130 receives inputs for the total measured power ($P_{Total}$) 132, a reference temperature differential wanted by the system 50 $T_{dRef}$ 134 and provides for controllers 102a, 102b, 102n ($T_{dRef1}$, $T_{dRef2}$, and $T_{dRefN}$) 136. The i/o unit 130 includes a processor 138, for performing processes including TEC power optimization, and storage/memory 139 associated with the processor 138. The output of the optimization process is signaled to the controllers 102a, 102b, 102n, by the i/o unit 130 via electronic communications (wired and/or wireless) as indicated by lines 140a, 140b, 140n. Through a user input device or unit 150, a desired temperature $T_{IN}$ is, for example, input into the system 50, via the i/o unit 130.

The TECs 100a, 100b, 100n are in accordance with those described in the aforementioned commonly owned US Patent Application entitled: Multilevel Thermoelectric Cooling Stack with Thermal Guard Rings, the disclosure of which is incorporated by reference in its entirety herein. The controllers 102a, 102b, 102n, are for example PID controllers. PID controllers, also known as three-term controllers, include control loop mechanisms employing feedback that is widely used in industrial control systems and a variety of other applications requiring continuously modulated control. The PID controller continuously calculates an error value e(t) as the difference between a desired setpoint (SP) and a measured process variable (PV) and applies a correction based on proportional, integral, and derivative terms (denoted P, I, and D respectively), and for example, are disclosed in "PID Controller", in Wikipedia at https://en.wikipedia.org/wiki/PID_controller, this disclosure incorporated by reference herein.

The power supplies 104a, 104b, 104n, each include, for example, a single chip set up known as LTC3886, from Linear Technologies, now Analog Devices of One Analog Way Wilmington, MA 01887, USA. The power supplies include switches, analog to digital converters (ADC), output current and output voltage measurement functions and the likes, that permit output power calculation.

The processor 138, is for example, a Central Processing Unit (CPU), formed of one or more processors, including microprocessors, for performing the system 50 functions including the power optimization process (method) for the TECs 100a, 100b, 100n. The processors are, for example, conventional processors, including hardware processors, and microcontrollers and such as those used in servers, computers, and other computerized devices. For example, the processors may include AVR ATmega Microcontrollers from Microchip Technology INC., Sitara Arm Processors, by Texas Instruments x86 Processors from AMD (Advanced Micro Devices)® and Intel®, Xenon® and Pentium® processors from Intel, as well as any combinations thereof.

The storage/memory 139 is any conventional storage media. The storage/memory 139 stores machine executable instructions for execution by the processor 138, to perform the processes disclosed herein, including the power optimization method. The storage/memory 139 also includes machine executable instructions associated with the operation of the components, including, for example, TECs 100a, 100b, 100n, controllers 102a, 102b, 102n, and power supplies 104a, 104b, 104n, and temperature sensors 120a, 120b, 120n. The storage/memory 139 also, for example, stores rules and policies for the system 50. The processor 138 and the storage/memory 139, although shown as a single component for representative purposes, may be multiple components, and may be outside of the i/o unit 130.

Figure 2:
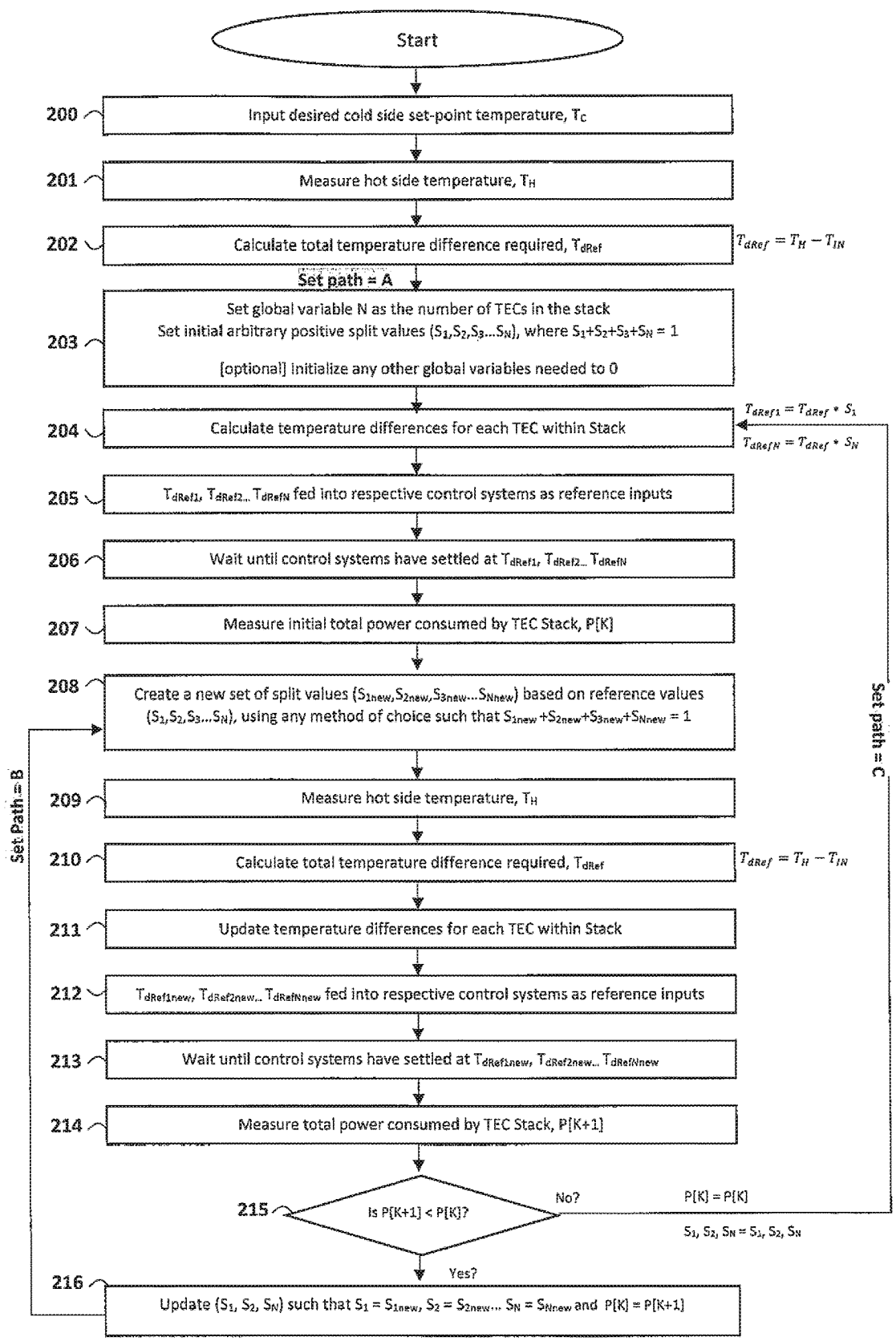
FIG. 2 is a flow diagram of a process in accordance with embodiments of the disclosed subject matter.

Attention is now directed to FIG. 2, which shows a flow diagram detailing computer-implemented processes and sub-processes in accordance with embodiments of the disclosed subject matter. FIG. 2 is a process for dynamically optimizing power to a plurality of TECs, for example, at least two TECs in a system 50, with the process scalable to more than two TECs, this process shown in FIG. 2, as well as FIGS. 3 and 4. Reference is also made to elements shown in FIGS. 1A and 1B. This process, for example, dynamically reduces the overall power consumption of a selected TEC stack in real-time.

Main Process

The main process is performed, for example, by varying the power delivered to each TEC in the stack in order to achieve a particular set of temperature differentials to achieve a target cold side temperature, $T_{IN}$. The concept of Hardware-In-The-Loop allows the process to achieve the true minimum power needed by the stack to reach the target temperature independently of any modelling inaccuracies. The aforementioned processes and sub-processes, including routines, also known as subroutines, e.g., Path A, Path B, and Path C, detailed below, are, for example, performed automatically and in real time.

In this process, for example, TEC operation is optimized through the manipulation of two split values at a time. This allows for the split value search space to be optimized one dimension at a time. Once this is completed, the process progressively optimizes the next two split values, repeating infinitely until the power reaches a minimum. Also, in the process, for example, the increment variable Δ shall be used throughout the process to add or subtract to the original split value $S_i$, creating a new split value $S_{inew}$.

Also in the process, for example, a set of global variables are also initialized for the process, as follows:

γ is a search shrinkage factor, which modulates the increment variable Δ as described in blocks 206 and 212. This depends on the power value difference between P[K] and P[K+1], whereby the smaller the difference, the smaller the value of γ, and, The index variable i which is used to select the 2 split values to be optimized. This is equal to the amount of TEC's used in the Stack, N.

The main process begins at block 200, with the user inputting the desired set point temperature, $T_{IN}$ of the cold side of the entire TEC stack 100. This is done, for example, by the use of any input method such as touch panel inputs, potentiometer readings, or any other method.

Moving to block 201, the process is such that the hot side temperature, $T_H$ on the other extreme side, for example, TEC N of the stack 100 is measured. The temperature measurements or readings made in and during the process are made using a variety of sensing technologies such as Resistance Temperature Detectors (RTD), Thermocouples, diode junctions, and the like.

At block 202, the temperature readings, made at the "hot" side $T_H$, allow for the Controller 102 to calculate the overall desired temperature difference, $T_{dRef}$. This is performed in accordance with Equation 1, as follows:

$$T_{dRef}=T_H-T_{IN} \qquad \text{[Equation 1]}$$

The process moves to block 203 and path flag is set=A, where an initial arbitrary set of positive split values (S$_1$,S$_2$, S$_3$, ..., S$_N$) are set, according to Equation 2, as follows:

$$S_1+S_2+S_3+S_N=1 \quad \text{[Equation 2]}$$

Optionally, the process is such that any global variables required may be set (e.g., initialized) to 0 (zero). These variables may be required by a multitude of subprocesses, such as that of block 208 (detailed below), when generating a new set of split values.

Moving to block 204, the split values (S$_1$,S$_2$,S$_3$, ..., S$_N$) are then used by the controller to apportion the temperature differential T$_{dRef}$ across each TEC 100a to 100n in the stack 100, where "N" or "n" is equal to the number of TECs in the stack 100. The temperature differential is in accordance with Equations 3a and 3b, as follows:

$$T_{dRef1}=T_{dRef}*S_1 \quad \text{[Equation 3a]}$$

$$T_{dRefN}=T_{dRef}*S_N \quad \text{[Equation 3b]}$$

Moving to block 205, the temperature apportionments T$_{dRef1}$ ... T$_{dRefN}$ are then fed into the respective TEC control system (controllers 102a-102n) as reference inputs. The individual TEC controllers 102a, 102b, 102n function to reduce the error 150a, 150b, and 150n, between the set temperature references T$_{dRef1}$ ... T$_{dRefN}$ and the read differential temperatures 160a, 160b, and 160n. For example, determining the temperature differential between each successive TEC 100a-100n in the TEC stack 100, may include directly reading from sensors 120a-120n or disconnecting, for a predetermined time, such as for a few milliseconds, each of the TECs 100a-100n from the stack 100, to measure the open circuit voltage (P$_1$, P$_2$ to P$_N$), which is indicative of the actual temperature difference across the respective disconnected TEC 100a-100n.

This signal is used to control the power delivered to each TEC 100a-100n by means of power supply units (PSUs) 104a, 104b to 104n.

At block 206, to which the process moves, the system waits until all temperatures have settled, for example, after a certain or predetermined time has elapsed, or when the wanted temperatures reach a specified percentage difference from the set temperatures. As a result, the TECs 100a-100n of the stack 100 reach the desired cold side temperature T$_{IN}$.

Moving to block 207, with the waiting complete, the power consumed by each individual TEC 100a-100n is then measured and recorded. From these recorded measurements, the total power initially consumed by the TEC stack, P[K], is calculated, where K is the iteration number for the process, which is initially set to 0 (zero). The process moves to block 208, with path being previously set=A.

Figure 3:
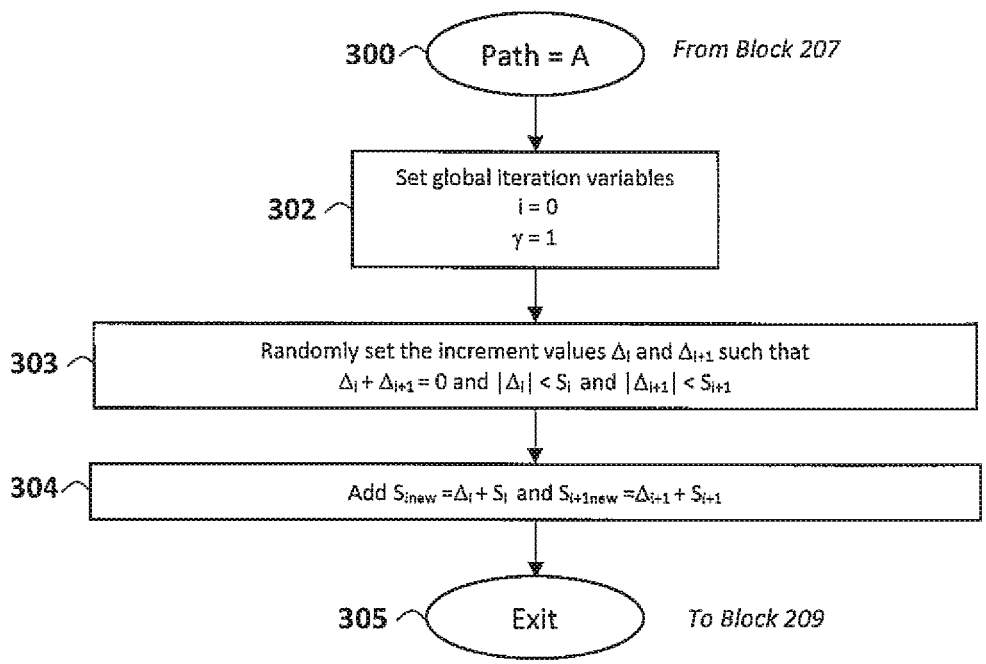
FIG. 3 is a flow diagram of an example subprocess which is part of Path A.

The process of Path A is shown in FIG. 3. The process is activated, triggered, or otherwise started, when the process reaches block 208, typically for the first time (e.g., the first or initial iteration), from block 207.

Moving to block 208, as per Path A, the process starts a subprocess of generating a new set of split values (S$_{1new}$, S$_{2new}$, S$_{3new}$, ..., S$_{Nnew}$). These new split values are selected in the vicinity (close to) of the previous values (S$_1$, S$_2$, S$_3$, ..., S$_N$), while adhering to the same constraints imposed in block 203. Each new set of split values allows the process to explore a different temperature apportionment across the entire TEC stack 100, ultimately resulting in a different power consumption.

Figure 4:
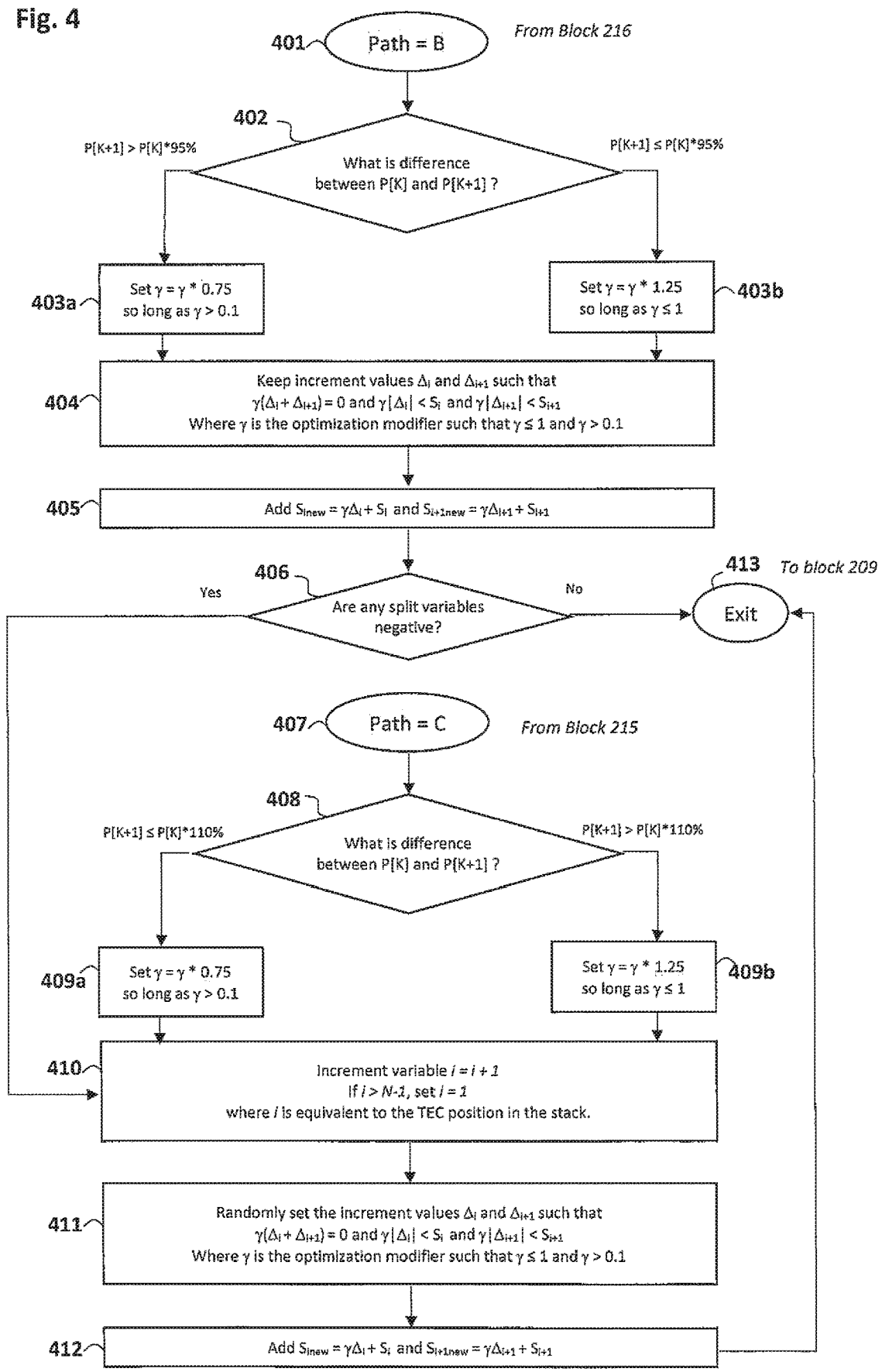
FIG. 4 is a flow diagram of two subprocesses taken along Path B and Path C.

Alternately, at block 208, other algorithms may be implemented to generate such split values and, for example, are explained in FIG. 4. At block 208, depending on the path taken to reach this block, different subprocesses for obtaining the split values are performed.

Path A

Returning to Path A, and FIG. 3, the process moves from block 207 to 208, block 208 here beginning at block 300 (a START block for Path A), where a routine, known as Path A begins. Upon this first iteration the sub-process or routine of FIG. 3 initializes the global variables i and γ, at block 302, such that the global iteration variables are set such that i, which represents the index variable is i=0, and γ, which represents a shrinkage factor, is such that γ=1.

The process moves to block 303 where the increment values of Δ$_i$ and Δ$_{i+1}$ are randomly set, arbitrary values (e.g., the criteria set by a process for Increment Values), keeping in accordance to Equations 4a, 4b, 4c, as follows:

$$\Delta_i+\Delta_{i+1}=0 \quad \text{[Equation 4a]}$$

$$|\Delta_i|<S_i \quad \text{[Equation 4b]}$$

$$|\Delta_{i+1}|<S_{i+1} \quad \text{[Equation 4c]}$$

The process moves to block 304, where the increment values are added to the respective split values S$_i$ and S$_{i+1}$ to create new split values, S$_{inew}$ and S$_{i+1new}$ (as in block 304) in accordance to Equations 5a and 5b. Once this subprocess is completed, the process, for example, ends, and exits the routine, at block 305, and continues, by moving to block 209.

$$S_{inew}=\Delta_i+S_i \quad \text{[Equation 5a]}$$

$$S_{i+1new}=\Delta_{i+1}+S_{i+1} \quad \text{[Equation 5b]}$$

Return to Main Process

At block 209, T$_H$ on the extreme side of the TEC stack 100 is read and updated. The process moves to block 210, where the overall temperature difference, T$_{dRef}$ is updated using Equation 1, Moving to block 211, using the new split values (S$_{1new}$, S$_{2new}$, S$_{3new}$, ..., S$_{Nnew}$) generated at block 208, the system updates the new desired temperature differences of each TEC 100a-100n, in accordance with Equation 6, as follows:

$$T_{dRefNnew}=T_{dRef}*S_{Nnew} \quad \text{[Equation 6]}$$

The process moves to block 212. These newly set temperature differences (T$_{dRef1new}$, T$_{dRef2new}$ ... T$_{dRefNnew}$) are then fed into the individual controllers 102a-102n as reference inputs. These temperature differences are then used to control the power delivered to each TEC 100a-100n by means of the power supply units (PSUs) 104a-104n, as detailed above.

Moving to block 213, the system 50 waits until the measured temperature T$_C$ (cold side 111 temperature) reaches the desired temperature T$_{IN}$. The process moves to block 214, where the system 50 measures the new power consumed by the TEC stack, P[K+1], similar to that done in block 207, as detailed above.

The process moves to block 215, where P[K+1] is then compared to the power achieved in the previous iteration, P[K]. If P[K+1] is larger than P[K] then S$_{1new}$, S$_{2new}$, S$_{3new}$, ..., S$_{Nnew}$ are discarded and the process returns to block 208, from where it resumes, in order to generate a new set of split values along Path A.

At block 215, should P[K+1] be less than P[K], the process moves to block 216. At block 216, the previously set split values (S$_1$, S$_2$, S$_3$, ..., S$_N$) are updated by the newly generated split values (S$_{1new}$, S$_{2new}$, S$_{3new}$, ..., S$_{Nnew}$), as the process moves to block 216. The power consumption value P[K] is also overwritten by the new power consumption P[K+1], expressed as:

$$S_1=S_{1new}, S_2=S_{2new}, S_3=s_{3new}, S_{Nnew}=S_{Nnew} \quad \text{[Equation 7a]}$$

$$P[K]=P[K+1] \quad \text{[Equation 7b]}$$

With these values updated at block 216, the process then returns to block 208 where Path B is taken, and from where the process resumes.

This process will be repeated, for example, potentially infinitely, until terminated by the user, to select split values that result in the least power consumed while maintaining the desired cold side temperature $T_{IN}$.

FIG. 4 is a flow diagram of a subprocess for Path B and Path C, based on the result of blocks 215 and 216, respectively, of FIG. 2. These Paths are routines of the main process, which form part of the example main optimization process, shown in FIG. 2.

Path B

Returning to block 208, and as shown in FIG. 4, Path B is an example optimization process, used to generate new split values, in order to progressively minimize the power consumed by the system. FIG. 4 is activated, for example, following all prior initiation, which include, for example, the initiation of a particular variable to 0 (zero) in order to identify that the algorithm is processing the very first iteration. In the processes of FIG. 4, TEC operation is optimized through the manipulation of two split values at a time. This allows for the split value search space to be optimized one dimension at a time. Once this is completed, the sub-process, for example, progressively optimizes the next two split values, repeating indefinitely, until the power reaches a minimum. The increment variable Δ shall be used throughout the algorithm to add or subtract to the original split value $S_i$, creating a new split value $S_{inew}$. For example, the process of FIG. 4 is performed automatically and/or in real time.

Path B (block 401) begins at block 216 of FIG. 2. For example, this subprocess begins after the second iteration of the process of FIG. 2. At this iteration, the power values P[K] and P[K+1] are compared, at block 402. The subprocess is used to determine and update the shrinkage factor γ, based on difference values, from the result of block 402 as follows.

The process moves to one of blocks 403a or 403b. For example, the process moves to block 403a when P[K+1] is more than 95% of P[K], γ is reduced to 0.75 of its previous value, as long as it the result remains larger than 0.1, expressed as SET γ=γ*0.75, so long as γ>0.1.

Alternately, the process moves to block 403b, when P[K] and P[K+1] are within 5% of each other, and as such, γ remains unchanged, e.g., SET γ=γ.

Still alternately, the process moves to block 403b, when P[K+1] is less or equal to than 95% of P[K], and γ is increased to 1.25 times its previous value, as long as the result remains smaller or equal to 1, expressed as SET γ=γ*1.25, so long as γ≤1.

From each of blocks 403a, 403b, the process moves to block 404. At block 404, a subprocess is performed to keep the increment values $\Delta_i$ and $\Delta_{i+1}$ using the shrinkage factor γ, given the following restrictions of Equations 8a, 8b, and 8c (New Criteria Set by the subprocess for updated increment values), such that:

$$\gamma(\Delta_i \text{ and } \Delta_{i+1})=0 \text{ and} \quad \text{[Equation 8a]}$$

$$\gamma|\Delta_i|<S_i \text{ and} \quad \text{[Equation 8b]}$$

$$\gamma|\Delta_{i+1}|<S_{i+1} \quad \text{[Equation 8c]}$$

The process then moves to block 405, where the new split values after the necessary operations result in the following:

$$S_{inew}=\gamma\Delta_i+S_i \text{ and} \quad \text{[Equation 9a]}$$

$$S_{i+1new}=\gamma\Delta_{i+1}+S_{i+1} \quad \text{[Equation 9b]}$$

such that the new split values $S_{inew}$ and $S_{i+1new}$ are updated with the new increment values created.

The process then moves to block 406, where if any of the split values turns negative, this implies that searching in that particular direction is exhausted and complete. Accordingly, the process moves to block 410. However, at block 406, should the split variables not be negative, e.g., positive, the process moves to block 412, where it exits, such that the process moves to block 209 from FIG. 2.

From block 406, should split values be negative, the process moves to block 410. At block 410, where the index variable i is incremented by 1, provided that when i reaches N, i is reset to 1. For example, this allows the process to optimize the split values along a different dimension. This is stated as:

$$\text{Increment variable } i=i+1 \quad \text{[Equation 10]}$$

If i>N−1, set i=1, where i is equivalent to the TEC position in the stack.

The process moves to block 411, where increment values $\Delta_i$ and $\Delta_{i+1}$ are again set to arbitrary or random values keeping to the same criteria shown in Equations 8a, 8b, and 8c, where γ is the optimization modifier so long as γ≤1 and γ>0.1

The process moves to block 412, where the new split values $S_{inew}$ and $S_{i+1new}$ are updated with the new increment values, and follow Equations 9a, and 9b.

From block 412, the process moves to block 413, where Path B ends and the process resumes from block 209.

Path C

Path C (block 407) begins at block 215 of FIG. 2. At this iteration, the power values P[K] and P[K+1] are compared, at block 408, and Split Values $S_1$, $S_2$, $S_N$ are updated.

This subprocess begins at block 408, where the power values P[K] and P[K+1] are again compared. The subprocess determines how to update the shrinkage factor γ, based on the difference values, as follows.

Based on the result of block 408, the process moves to one of blocks 409a or 409b. For example, the process moves to block 409a when P[K+1] is less than or equal to 110% of P[K], γ is reduced to 0.75 of its previous value, as long as the result is larger than 0.1. The process moves to block 409b, when P[K+1] is greater than 110% of P[K], and γ is increased to 1.25 times its previous value, as long as the result is smaller or equal to 1.

From each of blocks 409a and 409b, as well as block 406 the process moves to block 410, where the process resumes, as described above for Path B. The process continues to its end at block 213.

While the system and method have been shown with the disclosed TECs, other TECs and other Peltier cooling devices may be used with the aforementioned system and process, in accordance with the disclosure above.

EXAMPLES

Example 1

A computer-implemented method for controlling a plurality of thermoelectric cooling devices (TECs) in a stack of thermoelectric cooling devices, comprising: determining an overall temperature differential between the top surface of the topmost TEC and the bottom surface of the bottom TEC in the stack of TECs; determining a temperature differential across each successive TEC in the stack of TECs, based on the temperature between each successive TEC, and the top surface temperature, and bottom surface temperature of the stack; and, apportioning the temperature differential between each successive TEC in the stack to optimize the overall power consumption of the stack, such that the sum of the apportioned temperature differentials is at least approximately equal to the overall temperature differential.

Example 2

The computer-implemented method of Example 1, wherein minimizing the overall power consumption comprises optimizing the power consumption of at least some TEC's in the stack.

Example 3

The computer-implemented method of Example 1 or Example 2, additionally comprising: monitoring one or more temperatures in the TEC stack for temperature changes, and, if there is a temperature change, apportioning the change in temperature differential between each successive TEC in the stack to optimize the power consumption by each TEC in the stack.

Example 4

The computer-implemented method of any of Example 1 to Example 3, wherein the monitoring includes continuously monitoring one or more temperatures in the TEC stack for temperature changes.

Example 5

The computer-implemented method of any of Example 1 to Example 4, wherein the sum of the apportioned temperature differentials is equal to the desired overall temperature differential.

Example 6

The computer-implemented method of any of Example 1 to Example 5, wherein the apportioning the temperature differential between each successive TEC in the stack to optimize the power consumption by each TEC in the stack is performed in real time.

Example 7

The computer-implemented method of any of Example 1 to Example 6, wherein the power consumption is performed with hardware in the loop.

Example 8

The computer-implemented method of any of Example 1 to Example 7, wherein the determining the temperature differential between each successive TEC in the stack of TECs comprises disconnecting, for a predetermined time, each of the TECs from the stack to measure the open circuit voltage, which is indicative of the actual temperature difference across the respective disconnected TEC.

Example 9

The computer-implemented method of any of Example 1 to Example 8, wherein the apportioning the temperature differential between each successive TEC in the stack to optimize the power consumption by each TEC in the stack is performed by one or more of gradient descent processes, hill climbing processes, and, perturb and observe process, and any combinations and variations thereof.

Example 10

A system for controlling a plurality of thermoelectric cooling devices (TECs) in a stack of thermoelectric cooling devices, comprising: a plurality of temperature sensors in communication with each of the TECs in the stack of TECs; a power controller in communication with each of the TECs in the stack of TECs; and, a processor in communication with each of the temperature sensors and the power controller. The processor is programmed to: determine a temperature differential across each successive TEC in the stack of TECs, based on the temperature of the surfaces of each successive TEC; apportion the temperature differential between each successive TEC in the stack to optimize the total power consumption of the TEC stack, such that the sum of the apportioned temperature differentials is at least approximately equal to the desired overall temperature differential; and; cause the power controller to control power to each of the TECs to achieve the desired apportioned temperature differential.

Example 11

The system of Example 10, wherein the processor is additionally programmed to: minimize the overall power consumption including optimizing the power consumption of each said TEC in the stack.

Example 12

The system of Example 10 or Example 11, wherein the processor is additionally programmed to: monitor one or more temperatures in the TEC stack for temperature changes, and, if there is a temperature change, apportion the desired temperature differential between each successive TEC in the stack to optimize the power consumption by each TEC in the stack.

Example 13

The system of any of Example 10 to Example 12 wherein the processor monitoring one or more temperatures in the TEC stack for temperature changes, includes continuously monitoring one or more temperatures in the TEC stack for temperature changes.

Example 14

The system of any of Example 10 to Example 13, wherein the processor is such that the sum of the apportioned temperature differentials is equal to the overall desired temperature differential.

Example 15

The system of any of Example 10 to Example 14, wherein the processor apportions the temperature differential between each successive TEC in the stack to optimize the power consumption by each TEC in the stack in real time.

Example 16

The system of any of Example 10 to Example 15, wherein the processor determines the temperature differential between each successive TEC in the stack of TECs, and causes disconnecting, for a predetermined time, each of the TECs from the stack to measure the open circuit voltage, which is indicative of the actual temperature difference across the respective disconnected TEC.

Example 17

The system of any of Example 10 to Example 16, wherein the processor apportioning the temperature differential between each successive TEC in the stack to optimize the power consumption by each TEC in the stack, performs the apportioning by one or more of gradient descent processes, hill climbing processes, and perturb and observe process, and any combinations and variation thereof.

Example 18

A computer usable non-transitory storage medium having a computer program embodied thereon for causing a suitably programmed computer system to control a plurality of thermoelectric cooling devices (TECs) in a stack of thermoelectric cooling devices, by performing the following steps when such program is executed on the system, The steps comprising: determining an overall temperature differential between the top surface of the topmost TEC and the bottom surface of the bottom TEC in the stack of TECs; determining a temperature differential across each TEC in the stack of TECs, based on the temperature between each successive TEC, and the top surface temperature and the bottom surface temperature of the stack; and, apportioning the temperature differential between each successive TEC in the stack to minimize the overall power consumption of the stack, such that the sum of the apportioned temperature differentials is at least approximately equal to the overall desired temperature differential.

Example 19

The computer usable non-transitory storage medium of Example 18, wherein minimizing the overall power consumption comprises optimizing the power consumption by each said TEC in the stack.

Example 20

The computer usable non-transitory storage medium of Example 18 or Example 19, additionally comprising: monitoring one or more temperatures in the TEC stack for temperature changes, and, if there is a temperature change, apportion the change in temperature differential between each successive TEC in the stack to optimize the power consumption of each TEC in the stack.

Example 21

The computer usable non-transitory storage medium of any one of Example 18 to Example 20, wherein the monitoring includes continuously monitoring one or more temperatures in the TEC stack for temperature changes.

Example 22

The computer usable non-transitory storage medium of any of Example 18 to Example 21, wherein the sum of the apportioned temperature differentials is equal to the overall desired temperature differential.

Example 23

The computer usable non-transitory storage medium of any of Example 18 to Example 22, wherein the apportioning the temperature differential between each successive TEC in the stack to optimize the power consumption by each TEC in the stack is performed in real time.

Example 24

The computer usable non-transitory storage medium of any of Example 18 to Example 23, wherein the determining the temperature differential between each successive TEC in the stack of TECs comprises disconnecting, for a predetermined time, each of the TECs from the stack to measure the open circuit voltage, which is indicative of the actual temperature difference across the respective disconnected TEC.

Example 25

The computer usable non-transitory storage medium of any of Example 18 to Example 24, wherein the apportioning the temperature differential between each successive TEC in the stack to optimize the power consumption by each TEC in the stack is performed by one or more of gradient descent processes, hill climbing processes, and, perturb and observe processes, and any combinations and variations thereof.

Implementation of the processes (methods) and/or systems of embodiments of the disclosure can involve performing or completing selected tasks manually, automatically, or a combination thereof. Moreover, according to actual instrumentation and equipment of embodiments of the method and/or system of the disclosure, several selected tasks could be implemented by hardware, by software or by firmware or by a combination thereof using an operating system.

For example, hardware for performing selected tasks according to embodiments of the disclosure could be implemented as a chip or a circuit. As software, selected tasks according to embodiments of the disclosure could be implemented as a plurality of software instructions being executed by a computer using any suitable operating system. In an exemplary embodiment of the disclosure, one or more tasks according to exemplary embodiments of method and/or system as described herein are performed by a data processor, such as a computing platform for executing a plurality of instructions. Optionally, the data processor includes a volatile memory for storing instructions and/or data and/or a non-volatile storage, for example, non-transitory storage media such as a magnetic hard-disk and/or removable media, for storing instructions and/or data. Optionally, a network connection is provided as well. A display and/or a user input device such as a keyboard or mouse are optionally provided as well.

For example, any combination of one or more non-transitory computer readable (storage) medium(s) may be utilized in accordance with the above-listed embodiments of the present disclosure. A non-transitory computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: a portable computer diskette, a hard disk, a random access memory (RAM), a read-only memory (ROM), an erasable programmable read-only memory (EPROM or Flash memory), a portable compact disc read-only memory (CD-ROM), an optical storage device, a magnetic storage device, or any suitable combination of the foregoing. In the context of this document, a computer readable non-transitory storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

As will be understood with reference to the paragraphs and the referenced drawings, provided above, various embodiments of computer-implemented methods are provided herein, some of which can be performed by various embodiments of apparatuses and systems described herein and some of which can be performed according to instructions stored in non-transitory computer-readable storage media described herein. Still, some embodiments of computer-implemented methods provided herein can be performed by other apparatuses or systems and can be performed according to instructions stored in computer-readable storage media other than that described herein, as will become apparent to those having skill in the art with reference to the embodiments described herein. Any reference to systems and computer-readable storage media with respect to the following computer-implemented methods is provided for explanatory purposes, and is not intended to limit any of such systems and any of such non-transitory computer-readable storage media with regard to embodiments of computer-implemented methods described above. Likewise, any reference to the following computer-implemented methods with respect to systems and computer-readable storage media is provided for explanatory purposes, and is not intended to limit any of such computer-implemented methods disclosed herein.

The flowcharts and block diagrams in the Figures illustrate the architecture, functionality, and operation of possible implementations of systems, methods and computer program products according to various embodiments of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

As used herein, the singular form "a", "an" and "the" include plural references unless the context clearly dictates otherwise.

The word "exemplary" is used herein to mean "serving as an example, instance or illustration". Any embodiment described as "exemplary" is not necessarily to be construed as preferred or advantageous over other embodiments and/or to exclude the incorporation of features from other embodiments.

It is appreciated that certain features of the disclosure, which are, for clarity, described in the context of separate embodiments, may also be provided in combination in a single embodiment. Conversely, various features of the disclosure, which are, for brevity, described in the context of a single embodiment, may also be provided separately or in any suitable sub combination or as suitable in any other described embodiment of the disclosure. Certain features described in the context of various embodiments are not to be considered essential features of those embodiments, unless the embodiment is inoperative without those elements.

The above-described processes including portions thereof can be performed by software, hardware and combinations thereof. These processes and portions thereof can be performed by computers, computer-type devices, workstations, processors, micro-processors, other electronic searching tools and memory and other non-transitory storage-type devices associated therewith. The processes and portions thereof can also be embodied in programmable non-transitory storage media, for example, compact discs (CDs) or other discs including magnetic, optical, etc., readable by a machine or the like, or other computer usable storage media, including magnetic, optical, or semiconductor storage, or other source of electronic signals.

The processes (methods) and systems, including components thereof, herein have been described with exemplary reference to specific hardware and software. The processes (methods) have been described as exemplary, whereby specific steps and their order can be omitted and/or changed by persons of ordinary skill in the art to reduce these embodiments to practice without undue experimentation. The processes (methods) and systems have been described in a manner sufficient to enable persons of ordinary skill in the art to readily adapt other hardware and software as may be needed to reduce any of the embodiments to practice without undue experimentation and using conventional techniques.

Although the disclosure has been described in conjunction with specific embodiments thereof, it is evident that many alternatives, modifications and variations will be apparent to those skilled in the art. Accordingly, it is intended to embrace all such alternatives, modifications and variations that fall within the spirit and broad scope of the appended claims.

The invention claimed is:

1. A computer-implemented method for controlling a plurality of thermoelectric cooling devices (TECs) in a stack of thermoelectric cooling devices, comprising:
   determining an overall temperature differential between a top surface of a top TEC and a bottom surface of a bottom TEC, to top TEC positioned over the bottom TEC in the stack of TECs;
   determining a temperature differential across each TEC in the stack of TECs, based on the temperature between each successive TEC, and the top surface temperature of the top TEC and the bottom surface temperature of the bottom TEC, of the stack of TECs; and
   apportioning the temperature differential between each successive TEC in the stack of TECs to optimize the overall power consumption of the stack, such that the sum of the apportioned temperature differentials is at least approximately equal to the overall temperature differential, and the apportioning is performed by one or more of: gradient descent processes, hill climbing processes, and perturb and observe processes.

2. The computer-implemented method of claim 1, wherein minimizing the overall power consumption comprises optimizing the power consumption of at least two or more of the plurality of the TECs in the stack.

3. The computer-implemented method of claim 1, additionally comprising:
   monitoring one or more temperatures in the TEC stack for temperature changes, and,
   if there is a temperature change, apportioning the change in temperature differential between each successive TEC in the stack to optimize the power consumption by each TEC in the stack.

4. The computer-implemented method of claim 1, such that the sum of the apportioned temperature differentials is equal to the desired overall temperature differential.

5. The method of claim 1, wherein apportioning the temperature differential between each successive TEC in the stack to optimize the power consumption by each TEC in the stack is performed in real time.

6. The method of claim 1, wherein determining the temperature differential between each successive TEC in the stack of TECs comprises disconnecting, for a predetermined time, each of the TECs from the stack to measure the open circuit voltage, which is indicative of the actual temperature difference across the respective disconnected TEC.

7. The computer-implemented method of claim 3, wherein the monitoring includes continuously monitoring one or more temperatures in the TEC stack for temperature changes.

8. The method of claim 5, wherein the power consumption optimization is performed with hardware in the loop.

9. A system for controlling a plurality of thermoelectric cooling devices (TECs) in a stack of thermoelectric cooling devices, comprising:
   a plurality of temperature sensors in communication with each of the TECs in the stack of TECs;
   a power controller in communication with each of the TECs in the stack of TECs; and,
   a processor in communication with each of the temperature sensors and the power controller, the processor programmed to:
   determine a temperature differential across each successive TEC in the stack of TECs, based on the temperature of the surfaces of each successive TEC;
   apportion the temperature differential between each successive TEC in the stack, by performing one or more of: gradient descent processes, hill climbing processes, and perturb and observe processes, to optimize the total power consumption of the TEC stack, such that the sum of the apportioned temperature differentials is at least approximately equal to the desired overall temperature differential; and
   cause the power controller to control power to each of the TECs to achieve the desired apportioned temperature differential.

10. The system of claim 9, wherein the processor is additionally programmed to:
   minimize the power consumption including optimizing the power consumption of each said TEC in the stack.

11. The system of claim 9, wherein the processor is such that the sum of the apportioned temperature differentials is equal to the overall desired temperature differential.

12. The system of claim 9, wherein the processor apportions the temperature differential between each successive TEC in the stack to optimize the power consumption by each TEC in the stack in real time.

13. The system of claim 9, wherein the processor determines the temperature differential between each successive TEC in the stack of TECs, and causes disconnecting, for a predetermined time, each of the TECs from the stack to measure the open circuit voltage, which is indicative of the actual temperature difference across the respective disconnected TEC.

14. The system of claim 10, wherein the processor is additionally programmed to:
   monitor one or more temperatures in the TEC stack for temperature changes, and,
   if there is a temperature change, apportion the desired temperature differential between each successive TEC in the stack to optimize the power consumption by each TEC in the stack.

15. The system of claim 14 wherein the processor monitoring one or more temperatures in the TEC stack for temperature changes, includes continuously monitoring one or more temperatures in the TEC stack for temperature changes.

16. A computer usable non-transitory storage medium having a computer program embodied thereon for causing a suitably programmed computer system to control a plurality of thermoelectric cooling devices (TECs) in a stack of thermoelectric cooling devices, by performing the following steps when such program is executed on the system, the steps comprising:
   determining an overall temperature differential between a top surface of the top TEC and a bottom surface of a bottom TEC, the top TEC positioned over the bottom TEC in the stack of TECs;
   determining a temperature differential across each TEC in the stack of TECs, based on the temperature 1) between each successive TEC, and 2) the top surface temperature of the top TEC and the and bottom surface temperature of the bottom TEC, of the stack of TECs; and
   apportioning the temperature differential between each successive TEC in the stack to optimize the overall power consumption of the stack, by performing one or more of: gradient descent processes, hill climbing processes, and perturb and observe processes, such that the sum of the apportioned temperature differentials is at least approximately equal to the overall desired temperature differential.

17. The computer usable non-transitory storage medium of claim 16, wherein the optimizing the total power consumption comprises minimizing the power consumption by each said TEC in the stack.

18. The computer usable non-transitory storage medium of claim 16, additionally comprising:
monitoring one or more temperatures in the TEC stack for temperature changes, and,
if there is a temperature change, apportion the change in temperature differential between each successive TEC in the stack to optimize the power consumption by each TEC in the stack.

19. The computer-implemented method of claim 16, wherein the sum of the apportioned temperature differentials is equal to the overall desired temperature differential.

20. The computer usable non-transitory storage medium of claim 16, wherein apportioning the temperature differential between each successive TEC in the stack to optimize the power consumption by each TEC in the stack is performed in real time.

21. The computer usable non-transitory storage medium of claim 16, wherein the determining the temperature differential between each successive TEC in the stack of TECs comprises disconnecting, for a predetermined time, each of the TECs from the stack to measure the open circuit voltage, which is indicative of the actual temperature difference across the respective disconnected TEC.

22. The computer-implemented method of claim 18, wherein the monitoring includes continuously monitoring one or more temperatures in the TEC stack for temperature changes.

* * * * *